United States Patent [19]

Steely

[11] Patent Number: 4,841,520
[45] Date of Patent: Jun. 20, 1989

[54] DATA TRANSMISSION SYSTEM WITH BUS FAILURE DETECTION SYSTEM

[75] Inventor: Lee W. Steely, Reinholds, Pa.

[73] Assignee: AMP Incorporated, Harrisburg, Pa.

[21] Appl. No.: 130,247

[22] Filed: Dec. 8, 1987

Related U.S. Application Data

[63] Continuation-in-part of Ser. No. 921,185, Oct. 21, 1986.

[51] Int. Cl.$^4$ ............................................. H04J 3/14
[52] U.S. Cl. ......................................... 370/13; 370/85; 340/825.16
[58] Field of Search .................. 370/13, 14, 16, 17, 370/85, 88, 100; 340/825.16; 371/16, 61, 22

[56] References Cited

U.S. PATENT DOCUMENTS

| | | | |
|---|---|---|---|
| 2,723,309 | 11/1955 | Lair et al. | 370/85 |
| 3,601,806 | 8/1971 | Heimbigner | 340/151 |
| 3,808,381 | 4/1974 | Jacobs et al. | 340/825.16 |
| 4,156,112 | 5/1979 | Moreland | 179/15 AL |
| 4,290,134 | 9/1981 | Hampshire | 370/92 |
| 4,293,947 | 10/1981 | Brittain | 370/89 |
| 4,370,561 | 1/1983 | Briggs | 370/9 |
| 4,435,706 | 3/1984 | Callan | 340/825.08 |
| 4,475,191 | 10/1984 | James et al. | 370/85 |
| 4,503,490 | 3/1985 | Thompson | 371/61 |
| 4,535,448 | 8/1985 | Baxter et al. | 370/85 |
| 4,559,536 | 12/1985 | Olesen et al. | 340/825.07 |
| 4,660,201 | 4/1987 | Nakamura | 340/825.16 |
| 4,682,168 | 7/1987 | Chang et al. | 340/825.65 |
| 4,787,082 | 11/1988 | Delaney et al. | 370/85 |

FOREIGN PATENT DOCUMENTS

| | | |
|---|---|---|
| 51893/73 | 8/1974 | Australia . |
| 2412959 | 10/1975 | Fed. Rep. of Germany . |
| 1437097 | 6/1965 | France . |
| 2245036 | 4/1975 | France . |
| 2528646 | 12/1983 | France . |

Primary Examiner—Douglas W. Olms
Assistant Examiner—Melvin Marcelo

[57] ABSTRACT

A multiplex system includes a bus, a central controller coupled to the bus, and a number of remote stations coupled to the bus. The central controller applies clock signals to the bus, receives data signals from the bus, and applies data signals to the bus. The remote stations each maintain a respective count of clock signals and exchange data signals with the bus during respective time periods corresponding to respective counts. The controller operates to detect a failure of the bus and then to prevent clock signals from being carried to the remote stations associated with the failed bus. In this way, erratic operation of the remote stations is minimized.

10 Claims, 14 Drawing Sheets

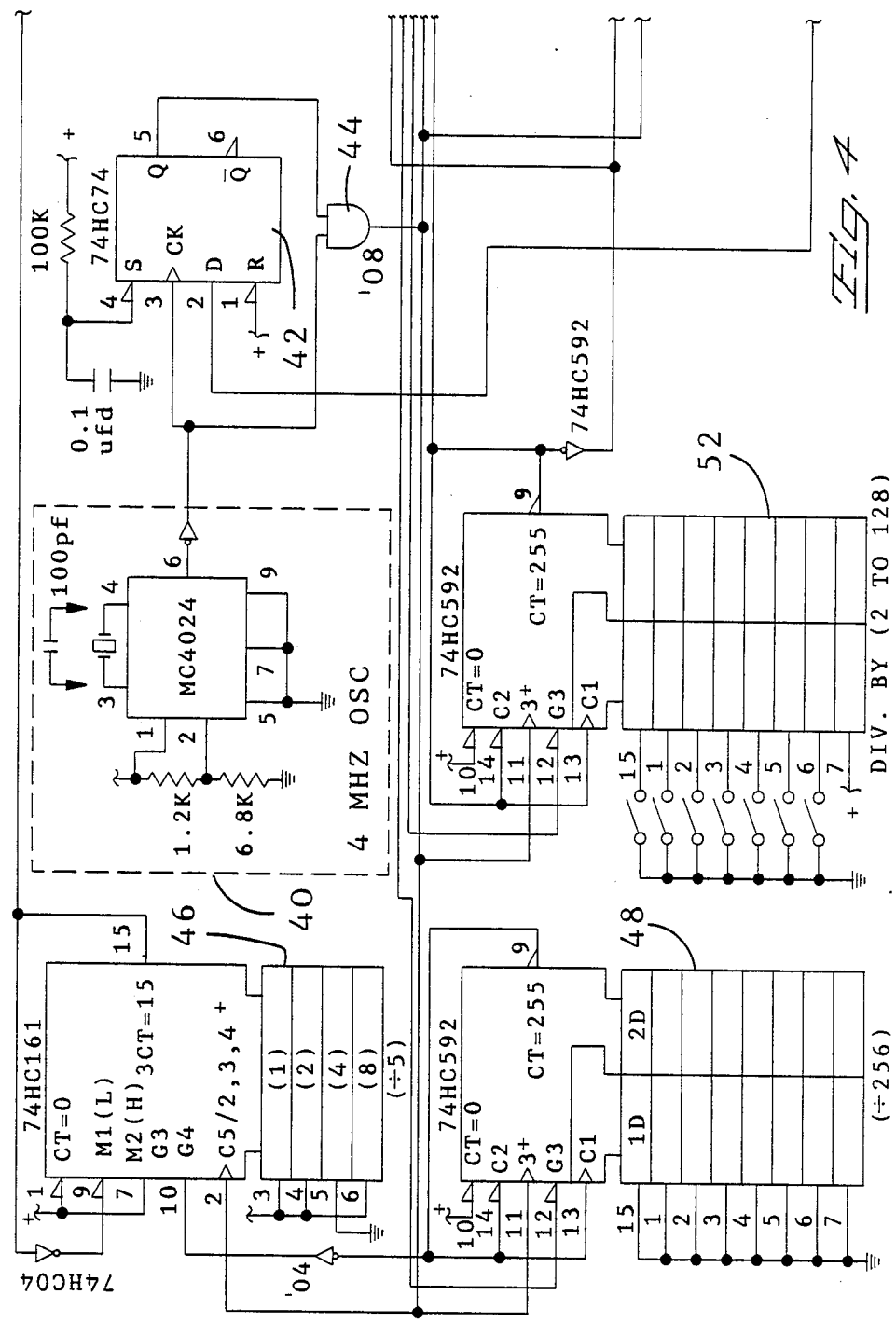

DATA TRANSMISSION SYSTEM WITH BUS FAILURE DETECTION SYSTEM

CROSS REFERENCE TO RELATED APPLICATION

This application is a continuation in part of U.S. patent application Ser. No. 06/921,185, filed Oct. 21, 1986, entitled "Data Transmission System". The entire text of application Ser. No. 06/921,185 is hereby incorporated by reference in this application.

BACKGROUND OF THE INVENTION

The present invention relates to a data transmission system which utilizes multiplex techniques to transmit data signals among interface circuits.

In the past, a variety of multiplexing systems have been used to reduce the wiring requirements in data transmission systems. Related U.S. patent application Ser. No. 06/567,476 and U.S. Pat. No. 4,293,947 both disclose data transmission systems in which the central station is connected to a series of remote stations by a bus which transmits both clock signals and data signals. Each of the remote stations includes a counter which maintains a count of the clock pulses. Each of the remote stations has a unique address, and when the count of clock pulses equals the address, the respective remote station is enabled so as to transmit data between the remote station and the central station via the bus.

This approach to a data transmission system requires the use of a relatively sophisticated central station that receives data signals from the remote stations, processes the data signals, and then sends out commands to the remote stations. With this approach, the remote stations do not transmit data directly from one remote station to another; instead the central station always acts as an intermediary.

The data transmission system described in above-referenced application Ser. No. 921,185 allows one remote station to communicate directly with another, thereby eliminating the need for a sophisticated central station.

With both types of multiplex systems a failure in the bus can prevent reliable communication with the remote stations. In particular, the remote stations respond to the clock pulses by reading data from the bus, and a bus failure which prevents accurate transmission of data signals will cause the remote stations to read incorrect data from the bus. This can present a safety hazard when the remote stations are used to control motors, as for example in a vehicle multiplex system. Application Ser. No. 921,185 recognizes this problem and provides means for interrupting generation of the clock signals when a bus failure was detected.

It is an object of this invention to provide protection against a bus failure in a multiplex system of the type that includes a central station.

SUMMARY OF THE INVENTION

This invention relates to a fault detection system for a multiplex system of the type comprising bus means, a central controller coupled to the bus means and comprising means for applying clock signals to the bus means, means for receiving data signals from the bus means, and means for applying data signals to the bus means. A first remote station is coupled to the bus means and comprises first means for maintaining a count of the clock signals and means for applying a first data signal to the bus means during a time period corresponding to a first selected count. A second remote station is coupled to the bus means and comprises second means for maintaining a count of the clock signals, and means for receiving a second data signal from the bus means during a time period corresponding to a second selected count.

According to this invention, the fault detection system includes third means for detecting a failure of the bus means, and fourth means, responsive to the third means, for preventing the clock signals from being carried at least to the second remote station during a detected failure of the bus means.

Preferably, a plurality of parallel buses radiate from the central controller, each to a respective subset of the remote stations. When this approach is used the detecting means preferably detects which of the individual buses has failed, and the preventing means only prevents the clock pulses from being carried to the subset of remote stations associated with the failed one of the individual buses. In this way, the remainder of the multiplex system can continue to operate normally.

This invention provides the important advantage of interrupting the generation of clock signals when any of the buses has failed. In this way, the affected remote stations are prevented from further counting, and it is ensured that no additional data will be read from the failed bus by the associated remote stations. In this way, erratic or undesired control of the remote stations can be reduced or eliminated.

The invention itself, together with further objects and attendant advantages, will best be understood by reference to the following detailed description, taken in conjunction with the accompanying drawings.

BRIEF DESCRIPTION OF THE DRAWINGS

FIG. 4 is a detailed schematic diagram of a first portion of the oscillator of FIG. 1.

DETAILED DESCRIPTION OF THE PRESENTLY PREFERRED EMBODIMENTS

The First Preferred Embodiment

Figure 1:
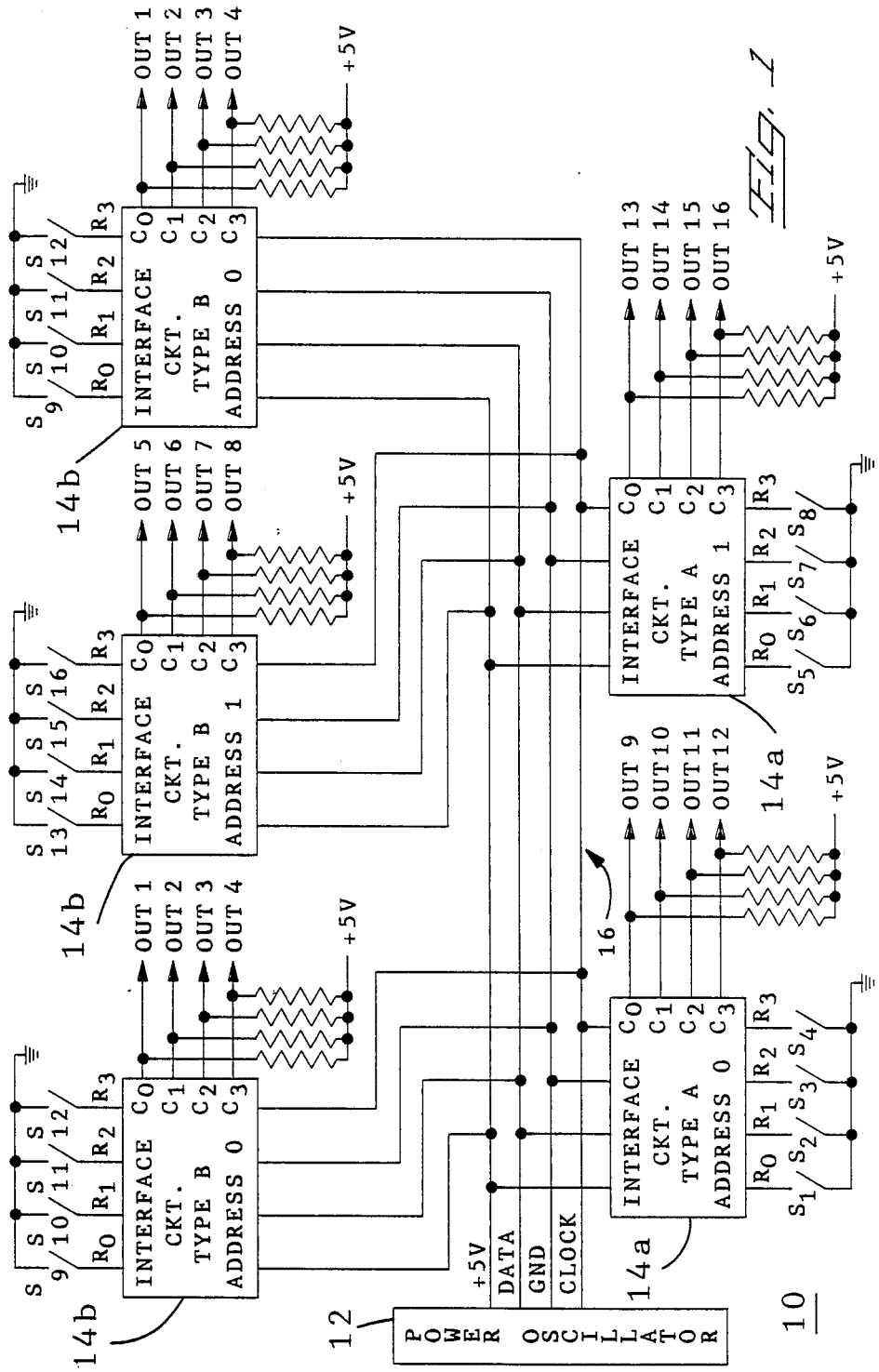
FIG. 1 is a block diagram of a data transmission system.

Turning now to the drawings, FIG. 1 shows a schematic diagram of a data transmission system 10 which includes a power oscillator 12 and a plurality of interface circuits 14a, 14b. These interface circuits 14a, 14b are of two separate types: type A indicated by the reference number 14a and type B indicated by the reference number 14b. The difference between these two types of interface circuits 14a, 14b will be described in detail below. In general, the number of interface circuits 14a, 14b depends entirely upon the intended application for the data transmission system 10 and can range from as few as two to hundreds of separate interface circuits 14a, 14b.

The interface circuits 14a, 14b and the power oscillator 12 are interconnected by a bus 16 as shown in FIG. 1. This bus 16 includes in the embodiment of FIG. 1 four separate conductors: a pair of power conductors labeled +5V and GND in FIG. 1 which supply electrical power from the power oscillator 12 to the interface circuits 14a, 14b a data conductor which transmits data signals from one interface circuit 14a, 14b to another, and a clock conductor which transmits clock signals generated by the power oscillator 12 to each of the interface circuits 14a, 14b for timing and synchronization purposes.

As shown in FIG. 1 each of the interface circuits 14a, 14b includes four input terminals labeled $R_0$–$R_3$. Each of these input terminals is adapted to receive a binary input signal which can be in either the logic high or the logic low state. In addition, each of the interface circuits 14a, 14b includes four separate output terminals, labeled $C_0$–$C_3$ in FIG. 1. Each of these output terminals $C_0$–$C_3$ is adapted to carry a binary output signal which the interface circuit 14a, 14b can place either in the logic high or the logic low state.

Figure 2:
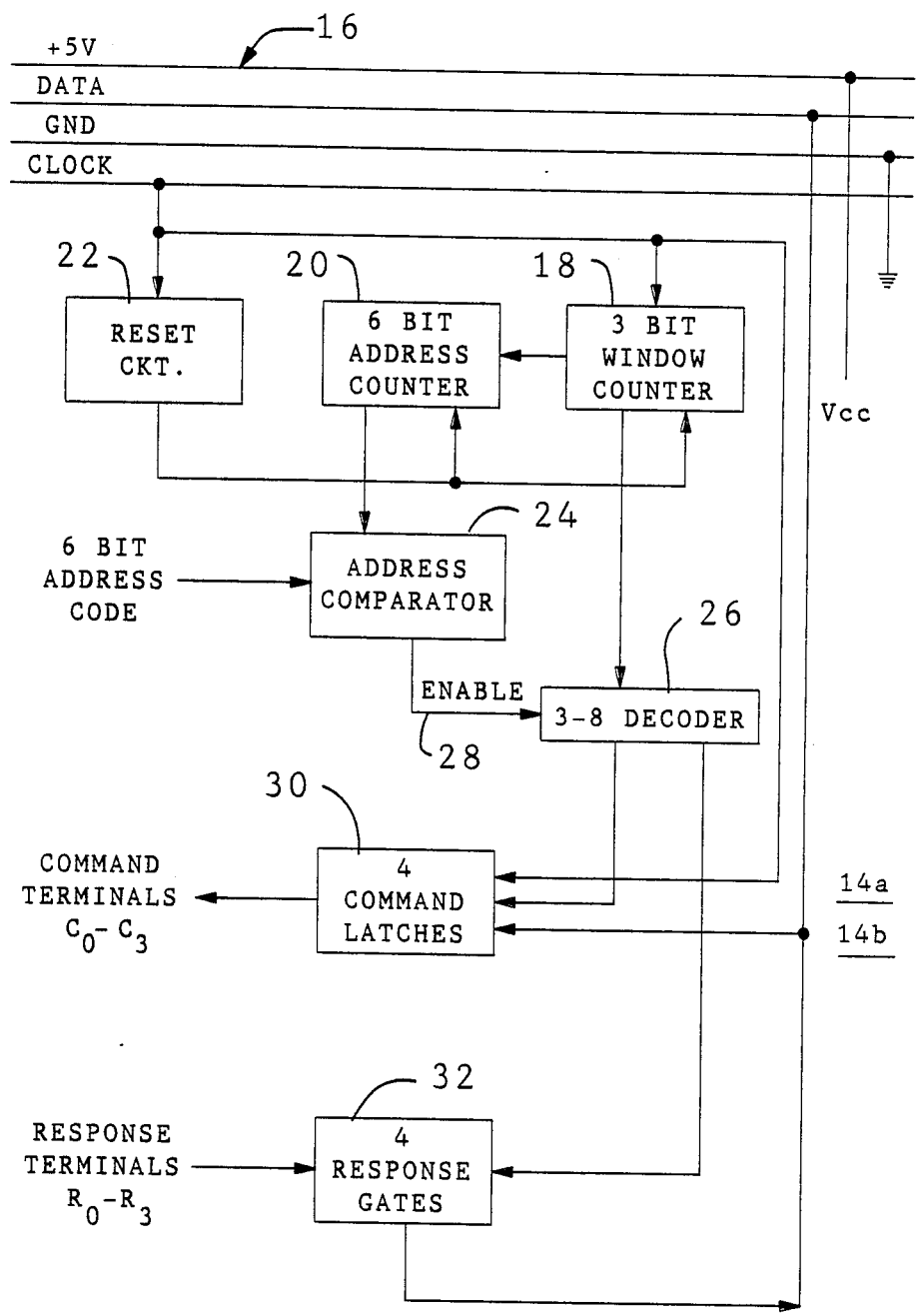
FIG. 2 is a block diagram of one of the interface circuits of FIG. 1.

The block diagram of FIG. 2 provides further information regarding the structure of the interface circuits 14a, 14b. As shown in FIG. 2 each of the interface circuits 14 includes a three bit window counter 18 and a six bit address counter 20. The three bit window counter 18 counts clock signals applied to the clock conductor by the power oscillator 12, and the six bit address counter 20 counts completed cycles of the three bit window counter 18. In effect the two counters 18, 20 form a single integrated nine bit counter which is responsive to the clock signals on the clock conductor. A reset circuit 22 is provided which is also responsive to the clock signals on the clock conductor. In the event a time period greater than a selected duration occurs between adjacent clock signals, the reset circuit 22 generates a reset pulse which resets both of the counters 18, 20. Thus, the power oscillator 12 can synchronize all of the interface circuits 14a, 14b by interrupting the clock pulses on the clock conductor for a time period greater than this predetermined duration.

Each of the interface circuits 14a, 14b includes six terminals for receiving a six bit binary address code. External switches (not shown) are used to set this six bit address code to any one of 64 possible values between 000000 and 111111. A six bit address comparator 24 receives as inputs the six bit address code and the contents of the six bit address counter 20. When the contents of the six bit address counter 20 equals the six bit address code, the address comparator 24 generates an enable signal on line 28.

This enable signal is applied as an enabling control signal to a 3-to-8 decoder 26. This decoder 26 receives as an input the three bit binary number stored by the window counter 18. The 3-to-8 decoder 26 decodes the contents of the window counter 18 to generate a series of control signals. The 3-to-8 decoder 26 generates control signals only when it is enabled by the enable signal on line 28.

The control signals generated by the 3-to-8 decoder 26 are applied to respective ones of four command latches 30 and four response gates 32. Thus, during the subset of 8 clock signals counted in the window counter 18 during the time interval while the address counter 20 is equal to the six bit address code, the 3-to-8 decoder 26 will enable the four command latches 30 and the four response gates 32 in a predetermined sequence. When each of the command latches 30 is enabled, it causes the logic state of the data conductor to be latched and applied to the respective command terminal $C_0$–$C_3$. Similarly, when each of the response gates 32 is enabled by the 3-to-8 decoder 26, the binary signal on the respective one of the response terminals $R_0$–$R_3$ is applied to the data conductor. As explained in greater detail below, the type A and type B interface circuits 14a, 14b differ in the relative order in which the command latches 30 and the response gates 32 are enabled.

Figure 3A:
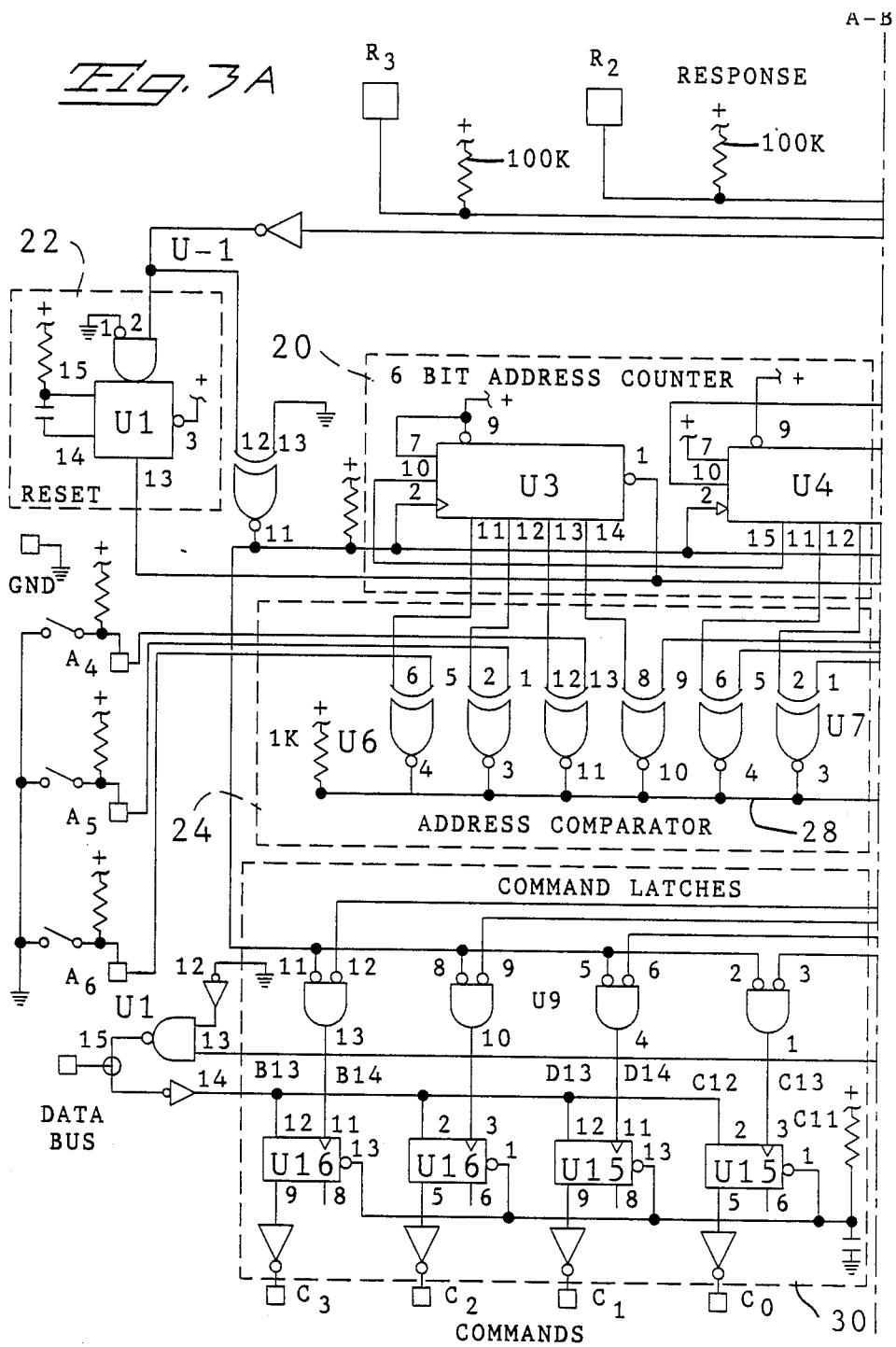
FIG. 3 is a detailed schematic diagram of one of the type A circuits.
Figure 3B:
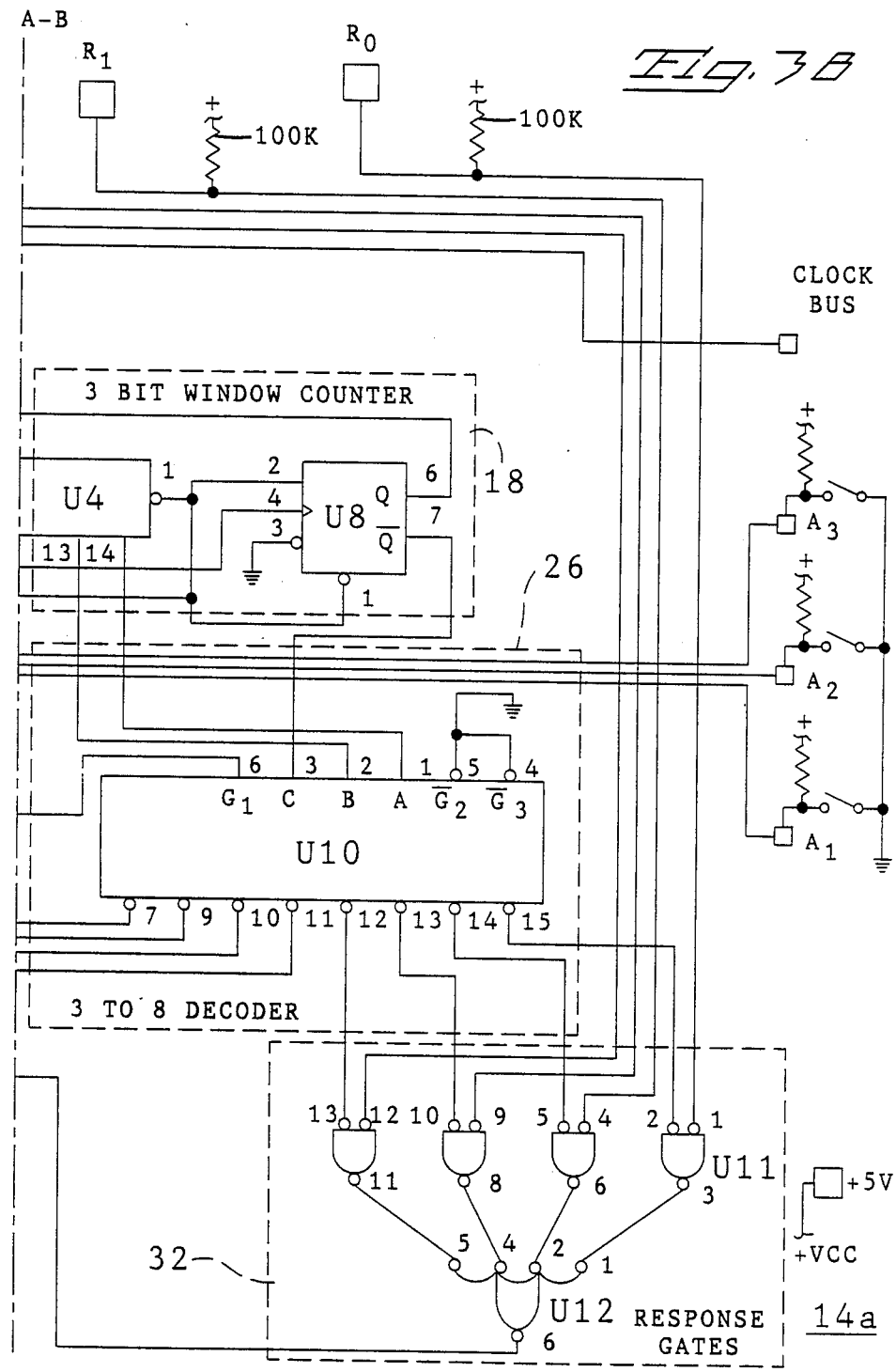

FIG. 3 shows a detailed schematic diagram of one of the type A interface circuits 14a. As shown in FIG. 3, the address counter 20 and the window counter 18 are implemented as a single integrated counter made up of a pair of four bit counters U3, U4 and a flip flop U8. The counter U4 is arranged to count cycles of the flip flop U8, and the counter U3 is arranged to count cycles of the counter U4. Thus, the two counters U3, U4 and the flip flop U8 form a nine bit counter. The lower order three bits of this counter (corresponding to the output of the flip flop U8 and the low order two bits of the counter U4) constitute the three bit window counter 18 and are applied to the signal inputs of the 3-to-8 decoder 26, which is implemented as an integrated circuit U10 in FIG. 3. The six bit address counter 20 is made up of the counter U3 and the high order two bits of the counter U4. Each of these six counting stages is applied to a respective inverting exclusive OR gate included in the address comparator 24. The other input of each of these inverting exclusive OR gates is coupled to a respective terminal $A_1$–$A_6$ adapted to receive a respective bit of the six bit address code.

As shown in FIG. 3, in this embodiment the reset circuit 22 includes a monostable multivibrator U1 which is reset by clock signals appearing on the clock conductor. The resistor and capacitor connected to the multivibrator U1 provide a pulse duration of 50–300 microseconds, preferably about 100 microseconds. In the event consecutive clock signals on the clock conductor are separated by less than this pulse duration, the reset circuit 22 allows the counters 18, 20 to count as described above. However, in the event no clock signals appear on the clock conductor for a period greater than this pulse duration, then the reset circuit 22 generates a reset pulse which resets both the counters U3, U4 and the flip flop U8.

The 3-to-8 decoder 26 applies output signals to the inverting NAND gates U11 included in the response gates 32, and to the inverting AND gates U9 included in the command latches 30. In the event the six bit count stored in the counters U3, U4 is equal to the six bit address code applied to the terminals $A_1$–$A_6$, the address comparator 24 applies an enable signal on line 28 to the 3-to-8 decoder 26. In the absence of such an enable signal all of the output signals of the 3-to-8 decoder 26 are in the logic high state. However, when the 3-to-8 decoder 26 is enabled by the address comparator 24, one of the eight output signals of the -3-to-8 decoder 26 is placed in the logic low state, depending upon the count stored in the three bit window counter 18. Thus, as the three bit window counter 18 cycles from 000 to 111, each of the eight outputs of the 3-to-8 decoder 26 is placed in the logic low state for a respective time period.

The response gates U11, U12 gate a selected one of the binary response signals applied to the terminals $R_0$-$R_3$ to the data conductor. The outputs of the 3-to-8 decoder 26 which are applied to the command latches 30 are gated by the inverting AND gates U9 with the clock signal from the clock conductor, and the resulting gated signal is applied as a clock input to the flip flops U15, U16. These flip flops U15, U16 store the logic state of the data conductor at respective time periods, as determined by the 3-to-8 decoder 26. The binary signals stored in the flip flops U15, U16 are applied via appropriate buffers to the command terminals $C_0$-$C_3$.

Each complete set of clock pulses generated by the power oscillator 12 can be thought of as a sequence of clock pulse bursts, or subsets, each of which includes eight clock pulses in this embodiment. The three bit window counter 18 stores a count indicative of one of eight "windows" in each burst or subset of clock pulses. The address counter 20 counts the number of subsets of clock pulses. The address counter 20 cooperates with the six bit address code and the address comparator 24 to enable the 3-to-8 decoder for only a single subset of clock pulses, determined by the six bit address code. The three bit window counter 18 cooperates with the 3-to-8 decoder 26, the response gates 32 and the command latches 30 to pass the binary signal appearing on each of the response terminals $R_0$-$R_3$ to the data conductor during a respective one of the eight windows, and to latch and store a command from the data conductor for each of the command terminals $C_0$-$C_3$ during a respective one of the eight windows.

Table 1 shows the difference between the type A and type B interface circuits 14a, 14b. In Table 1 the first column lists the window number, which ranges between 0 and 7. The second and third columns identify the data signal assigned to each of the eight windows. As shown in Table 1 in a type A interface circuit 14a the command signals $C_0$-$C_3$ appear on the even windows and the response signals $R_0$-$R_3$ appear on the odd windows. The right hand column of Table 1 shows that type B interface circuits 14b reverse this relationship, assigning the response signals $R_0$-$R_3$ to the even windows and the command signals $C_0$-$C_3$ to the odd windows.

TABLE 1

| WINDOW NUMBER | WINDOW IDENTIFICATION (TYPE A) | WINDOW IDENTIFICATION (TYPE B) |
|---|---|---|
| 0 | $C_0$ | $R_0$ |
| 1 | $R_0$ | $C_0$ |
| 2 | $C_1$ | $R_1$ |
| 3 | $R_1$ | $C_1$ |
| 4 | $C_2$ | $R_2$ |
| 5 | $R_2$ | $C_2$ |
| 6 | $C_3$ | $R_3$ |
| 7 | $R_3$ | $C_3$ |

The type B interface circuits 14b of this embodiment are identical in circuitry of FIG. 3, except that the C input to the 3-to-8 decoder U10 is coupled to the Q (pin 6) output of the flip flop U8 instead of the Q (pin 7) output of the flip flop U8 as shown in FIG. 3.

As explained in detail below, because the type A interface circuits 14a send responses during the time periods when the type B interface circuits 14b receive commands, and vice versa, it is possible for the interface circuits 14a, 14b to exchange data signals directly from one to the other.

Table 2 identifies presently preferred components of the schematic diagrams of FIG. 3. Each of these components is a well known, readily available commercial device, which needs no further explanation to be intelligible to those skilled in the art.

TABLE 2

| REFERENCE SYMBOL (FIG. 3) | COMPONENT | INTEGRATED CIRCUIT IDENTIFICATION |
|---|---|---|
| U1 | MONOSTABLE MULTIVIBRATOR | 74LS123 |
| U3 | 4 BIT BINARY COUNTER | 74LS161 |
| U4 | 4 BIT BINARY COUNTER | 74LS161 |
| U6 | INVERTING EXCLUSIVE OR GATE | 74LS266 |
| U7 | INVERTING EXCLUSIVE OR GATE | 74LS266 |
| U8 | J-K FLIP FLOP | 74LS109 |
| U9 | INVERTING AND GATE | 74LS02 |
| U10 | 3-TO-8 DECODER | 74LS138 |
| U11 | INVERTING NAND GATE | 74LS32 |
| U12 | INVERTING OR GATE | 74LS20 |
| U15 | D-TYPE FLIP FLOP | 74LS74 |
| U16 | D-TYPE FLIP FLOP | 74LS74 |

Figure 5:
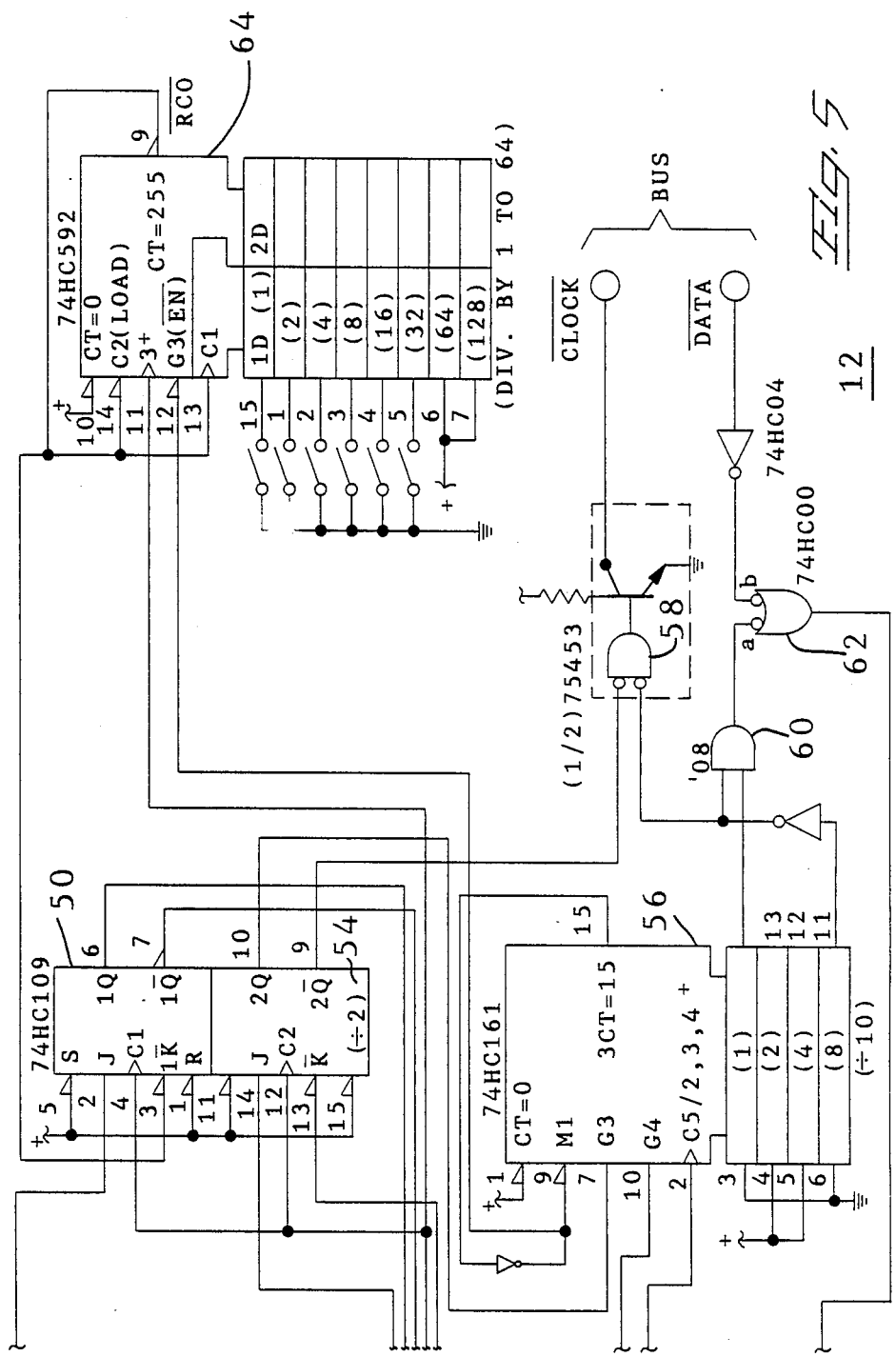
FIG. 5 is a schematic diagram of a second portion of the oscillator of FIG. 1.

FIGS. 4 and 5 provide schematic diagrams of the power oscillator 12, and are intended to be arranged side by side to make up a complete circuit diagram. As explained above, this power oscillator 12 generates sets of clock pulses separated by delay periods, wherein each set of clock pulses is made up of a number of bursts or subsets, each consisting of eight clock pulses. As explained below, the circuit of FIGS. 4 and 5 allows both clock period and the number of subsets of clock pulses included in each set to be adjusted by manually operated switches.

Turning now to FIG. 4, the power oscillator 12 includes a voltage controlled astable oscillator 40 which generates a 4 MHz signal at its output. Either a crystal as shown or a capacitor may be used to control the frequency of the oscillator 40. The output of the oscillator 40 is applied as an input to the clock terminal of a data bus integrity flip flop 42. The Q output of this flip flop 42 must be in the logic high state in order to enable the 4 MHz oscillator output signal to pass through the AND gate 44.

Two programmable counters 46, 48 are provided which have been configured such that the counter 46 divides by 5, and the counter 48 divides by 256. The two counters 46, 48 are coupled together in cascade and respond to the 4 MHz signal passed by the AND gate 44 in order to divide the 4 MHz oscillator output signal by 1280, giving a frequency of 3.125 KHz or a cycle period of 320 microseconds.

At the completion of this 320 microsecond cycle, the carry output of the counter 46 causes a flip flop 50 to place the 1Q output signal of the flip flop 50 in the logic high state. This disables the counter 48 and enables a counter 52.

Counter 52 is a programmable counter that may be programmed by means of the illustrated switches to divide by any number between 2 and 128. When enabled, the counter 52 counts cycles of the 4 MHz oscillator signal.

The flip flop 54 serves as a divide by 2 counter which responds to the carry output of the counter 52. Thus, the 2Q and 2Q outputs of the flip flop 54 generate respective square wave signals, having a frequency equal to 1/N1 MHz where N1 is a number between 1 and 64 encoded by the switches coupled to the counter 52. This corresponds to an output frequency of the flip flop 54 which varies between 1 MHz and 15.625 KHz. The flip flop 54 also serves to provide a square wave output.

It is the output signals generated by the flip flop 54 which determine the clock frequency of clock pulses applied to the clock conductor on the bus. Cycles of this clock signal are counted in a programmable counter 56 which is programmed to divide by 10. The counter 56 is a 4 stage binary counter that has been connected to have a preset of plus 6, thus shortening the count cycle to 6 through 15 and skipping 0 through 5. During the eight counts 8-15, the fourth stage of the counter 52 is in the logic high state.

The logical state of the clock conductor on the bus is controlled by a driver which includes an AND gate 58. This AND gate 58 receives as one input the 2Q output of the flip flop 54, and as the other input the inverted signal generated by the fourth stage of the counter 56. Thus, during counts 8-15 of the counter 56, the gate 58 is enabled and it passes the clock signal generated at the 2Q output of the flip flop 54 onto the clock conductor. During counts 6 and 7 of the counter 56, the clock bus is disabled. For this reason, only eight clock signals are sent out in each burst of clock signals, and a break period of two clock signals exists between adjacent bursts of the clock signals.

A programmable counter 64 responds to the carry output of the counter 56 to count the number of bursts of clock pulses generated by the counter 56. The counter 64 can be preset by the illustrated switches to any integer N2 between 1 and 64. When the total of N2 and the number of clock pulse bursts equals 64, the counter 64 generates a carry signal which causes the flip flop 50 to change state, thereby enabling the counters 46, 48 and disabling the counter 52 and starting the entire cycle over again. By using the switches connected to the counter 64, a user can select the number of clock signal bursts generated in the cycle to any integer between 1 and 64.

The logical state of the data conductor is tested during the period when the counter 56 has a value of 7. The gate 62 controls the flip flop 42 such that the flip flop 42 enables the gate 44 only when the gate 62 is in the logic high state. When the count stored in the counter 56 is not equal to 7, the input of the gate 62 coupled to the gate 60 is in the logic low state, and the gate 62 is in the logic high state. When the count stored in the counter 56 is equal to 7, the input of the gate 62 coupled to the inverter should be in the logic low state if the data conductor is not shorted, thereby maintaining the gate 62 in the logic high state. However, if the data conductor is shorted to the logic low state while the count of the counter 56 is equal to 7, the gate 62 will cause the flip flop 42 to set the Q output to the logic low state, thereby disabling the gate 44 and interrupting the 4 MHz signal. Operations will resume as soon as the short circuit on the data conductor is removed.

Having described the structure of the transmission system 10, its operation will now be described in conjunction with the timing and signal diagrams of FIG. 6a through 6i.

Figure 6:
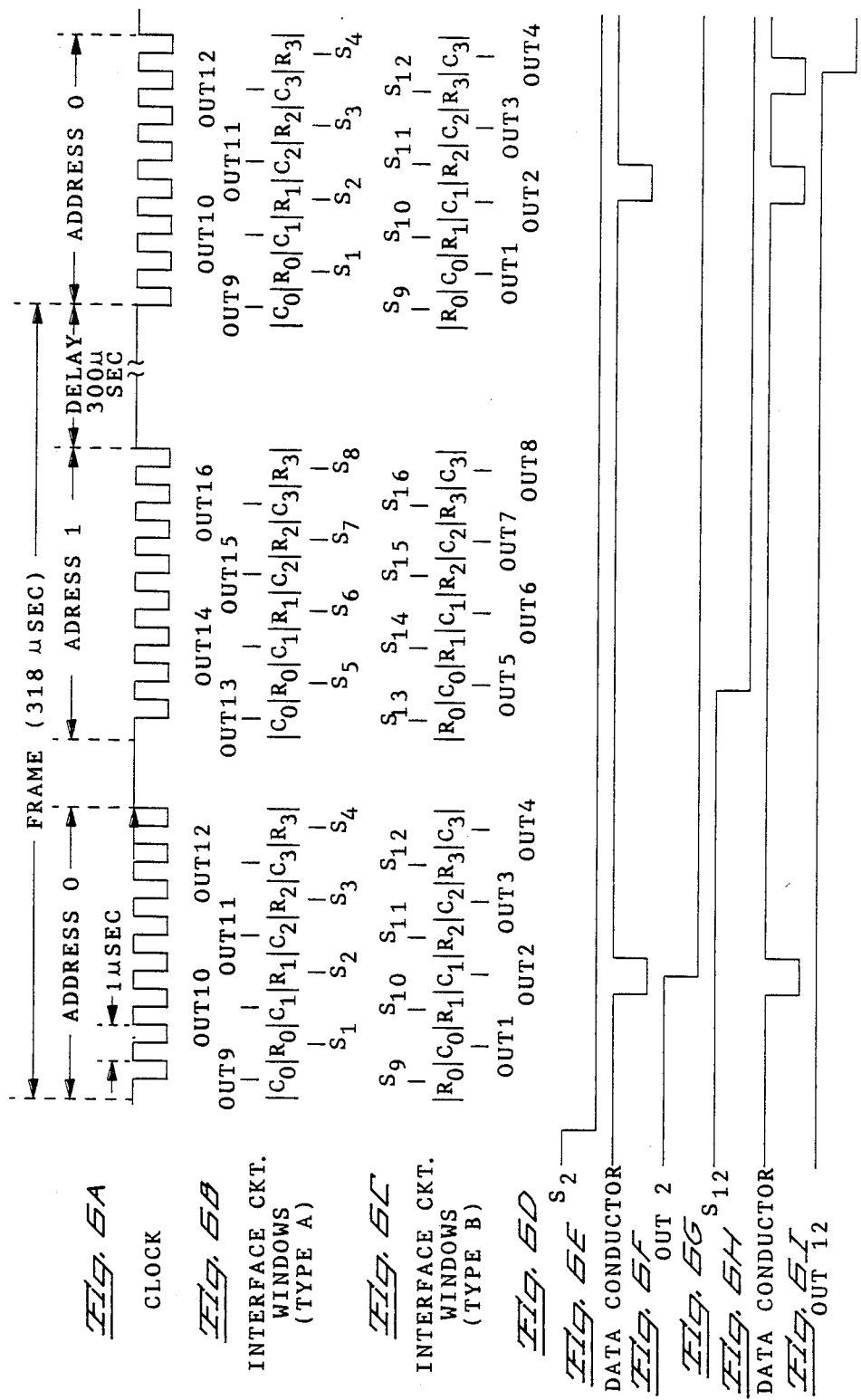
FIGS. 6a through 6i are a series of wave form and signal diagrams that illustrate the operation of the embodiment of FIG. 1.

FIG. 6a shows the clock pulses as they are applied to the clock conductor by the power oscillator 12. These clock pulses are each one microsecond in duration in this example and are formed as a 50 percent duty cycle square wave. The clock pulses are arranged in subsets or bursts of eight, and in this embodiment two consecutive subsets of eight clock pulses makeup the entire set of clock pulses. In this embodiment a delay of 320 microseconds is imposed between adjacent sets of clock pulses. This delay allows the reset circuit 22 time to generate a reset signal in order to insure that the counters 18, 22 of all of the interface circuits 14 start at zero at the beginning of each set of clock pulses.

The interface circuits 14a, 14b having the address code 000000 are enabled for only the first burst of clock pulses, and the interface circuits 14a, 14b having the address 000001 are enabled for only the second burst of clock pulses, as shown in FIG. 6a.

FIG. 6b shows the arrangement of command and response signals in the windows defined by the type A interface circuits 14a. In FIG. 6b, the signals on the response terminals $R_0-R_3$ are applied to the data conductor during the odd windows and the signals on the command terminals $C_0-C_3$ are read from the data conductor during the even windows.

As shown in FIG. 6c the type B interface circuits 14b apply the signals on the response terminals $R_0-R_3$ to the data conductor during the even windows and retrieve the signals for the command terminals $C_0-C_3$ from the data conductor during the odd windows.

FIG. 1 shows an exemplary arrangement of switches S1-S16 and output signals OUT1-OUT16. Each of the response terminals $R_0-R_3$ of each of the interface circuits 14a, 14b is in the logic high state unless the corresponding one of the switches $S_1-S_{16}$ is closed. Similarly, each of the output signals OUT1-OUT16 is in the logic high state unless the respective command terminal $C_0-C_3$ is in the logic low state.

FIGS. 6b and 6c show the assignment of the switches $S_1-S_{16}$ and the assignment of the output signals OUT1-OUT16 to the respective windows. It should be noted that each of the switches S1-S16 is assigned to the same window as the respective one of the output signals OUT1-OUT16. Thus, during the second window of the first burst (address 0) switch S1 determines the logic state of the data conductor and the output signal OUT1 responds to the logic state of the data conductor.

This mode of operation will better be understood in conjunction with FIGS. 6d-6i. FIG. 6d shows the switch S2 as being closed at an arbitrary time before the beginning of the frame shown in FIG. 6a. It is assumed at this point that all of the other switches S1 and S3-S16 are open. In this state the data conductor remains in the logic high state until the fourth window of the first burst (address 0), as shown in FIG. 6e. During this window the closed switch S2 causes the respective type A interface circuit 14A to bring the data conductor to the logic low state. As shown in FIG. 6e the data conductor remains in the logic high state except during the fourth window of the first burst (address 0) of each frame.

As shown in FIG. 6f, the output signal OUT2 remains in the logic high state until the fourth window of the first burst, during which all type B interface circuits 14B having the address 0 place the command terminal $C_1$ in the logic low state.

FIG. 6g shows the state of the switch S12, which is closed after the switch S2 but before the second frame which is partially shown in FIG. 6a. As shown in FIG. 6h, the data conductor remains in the logic high state except for the fourth window of the first burst (address 0), when the switch S2 causes the data conductor to be placed in the logic low state, and during the seventh window of the first burst (address 0) when the switch S12 causes the data conductor to be placed in the logic low state. As shown in FIG. 6i the output signal OUT12 is placed in the logic low state by the type A interface circuit 14a having the address code zero, which places the command terminal $C_3$ in the logic low state.

From the foregoing description it should be apparent that the data transmission system 10 allows the type A interface circuits 14a to send data signals directly to the type B interface circuits 14b, and the type B interface circuits 14b to send data signals directly to the type A interface circuits 14a, all without intermediate storage or processing of the data signals by the power oscillator 12. All of the interface circuits 14a, 14b having the same address are enabled during the same burst or subset of clock signals and for this reason a single interface circuit 14a, 14b can send data signals to a number of other interface circuits 14b, 14a. Similarly, signals originating from anyone of a number of interface circuits 14a, 14b can be transmitted to a single interface circuit 14b, 14a.

A simple example of this mode of operation is illustrated in the transmission system 10 of FIG. 1, where the switch S1 can be used to send signals to both of the type B interface circuits 14b having address zero. Similarly, either of the two switches labeled S9 in FIG. 1 can be used to send a data signal to OUT9 of the type A interface circuit 14a.

This feature of the invention can be of importance in many applications. For example, where a single switch input is intended to control a number of separate lights (such as the headlights, the tail lights and the parking lights of a vehicle), one type A interface circuit having the response terminal $R_0$ connected to the switch $S_1$ can be combined with six type B interface circuits, each having a command terminal $C_0$ connected to control a respective one of the six lights. As another example, where it is desired to allow electrical switches in either the front seat or the back seat of a vehicle to control window motors, two type A interface circuits, each having the same address and each having a respective window control switch connected to the response terminal $R_0$, can share their address with a single type B interface circuit having a command terminal $C_0$ which controls the window motor.

The Second Preferred Embodiment

Figure 7:
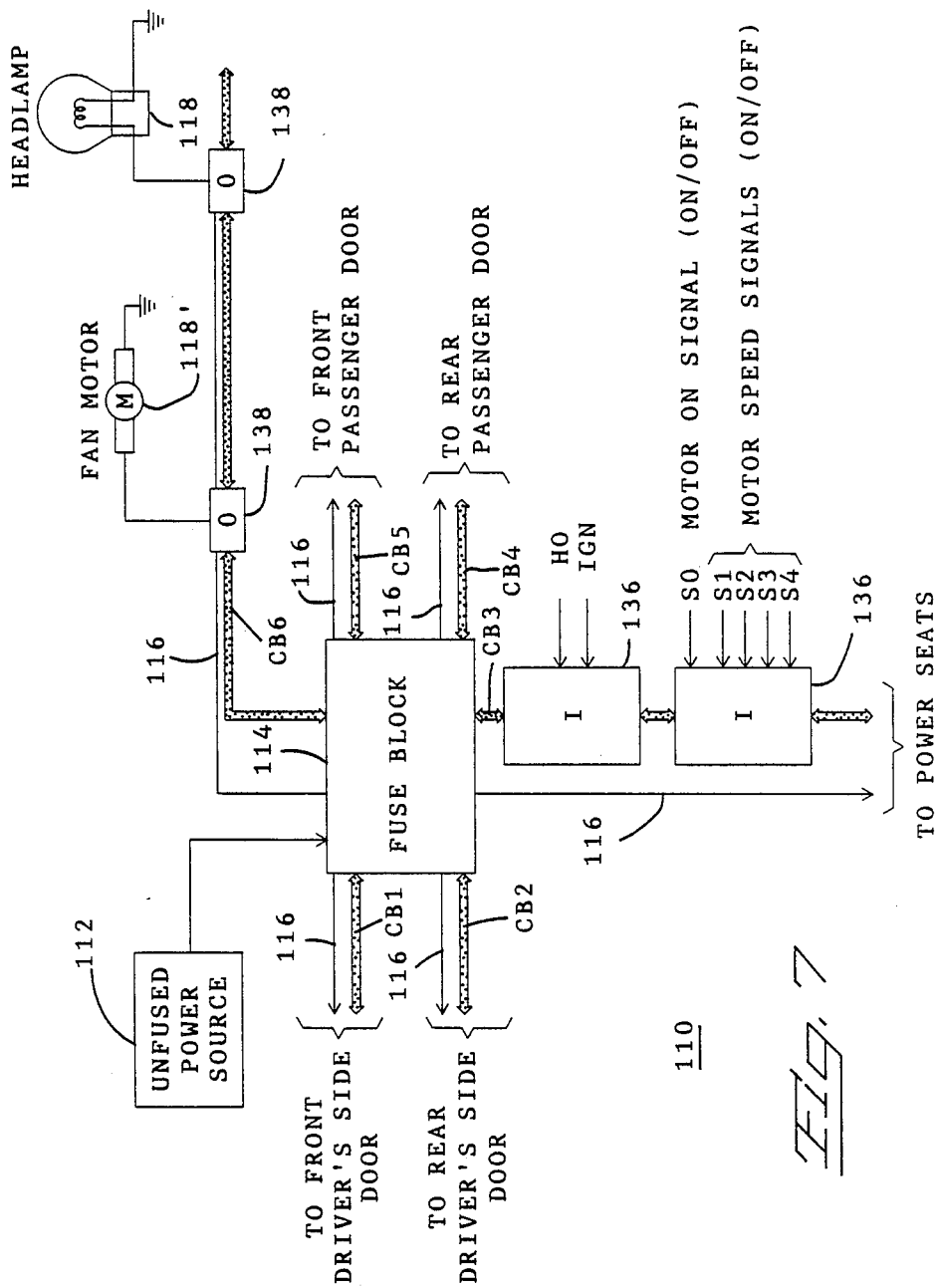
FIG. 7 is a block diagram of a second data transmission system.

Turning now to FIGS. 7-13, FIG. 7 shows a vehicle multiplex system 110 which is adapted for use with a vehicle such as an automobile of the type which includes an unfused power source 112 and a fuse block 114. A number of DC power buses 116 radiate from the fuse block 114, along with a number of parallel control buses CB1-CB6. FIG. 7 is not intended to show the entire multiplex system of the vehicle, but only those portions are important to understanding the operation of this embodiment. As shown in FIG. 7, control bus CB3 receives input signals indicative of whether the headlamp is to be switched on or off, whether the ignition is on or off, whether the fan motor is to be switched on or off, and the desired fan motor speed. In addition, the control bus CB6 controls power as described below to a headlamp 118 and a fan motor 118'.

Figure 8:
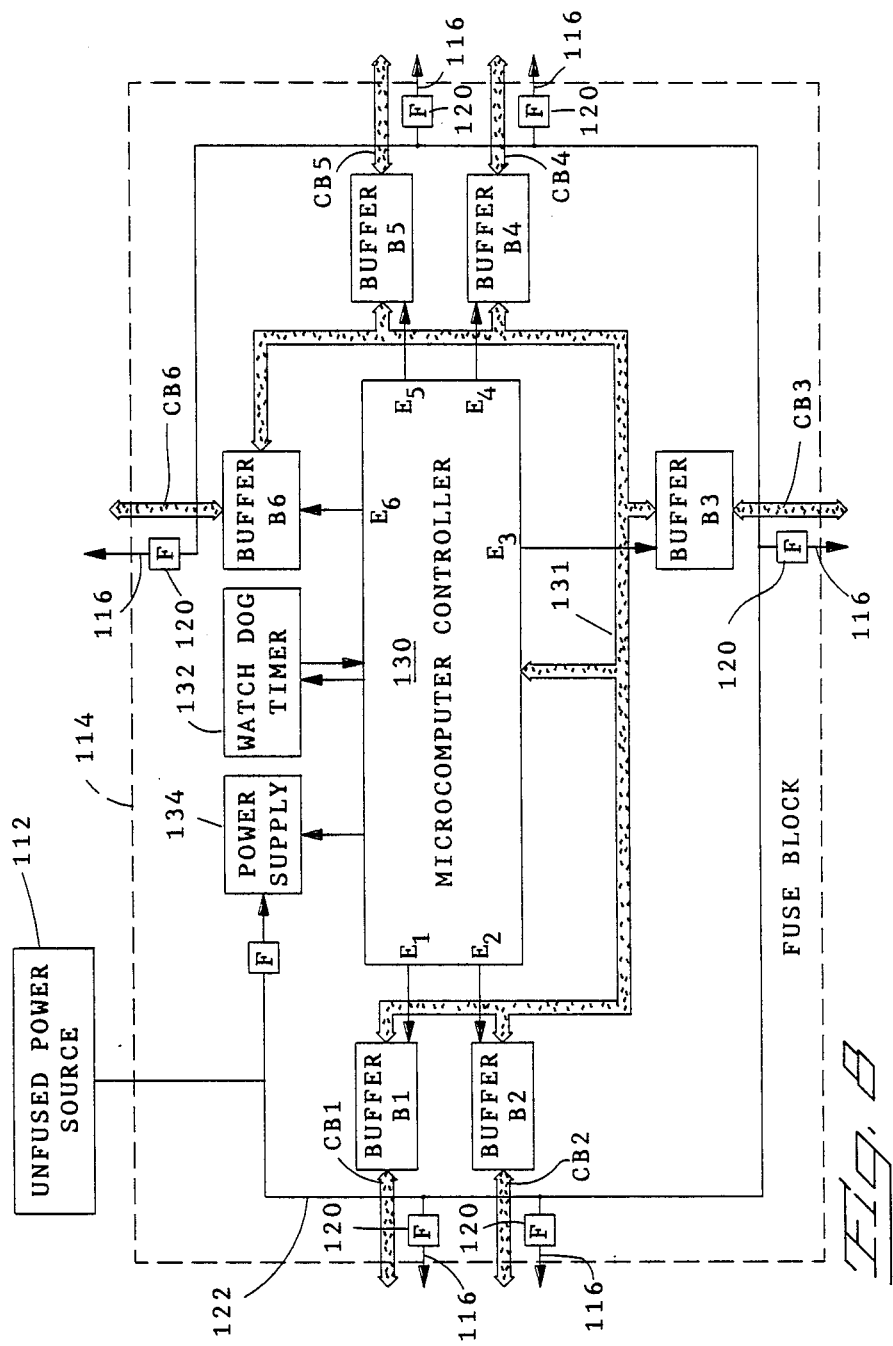
FIG. 8 is a block diagram of the fuse block of FIG. 7.

FIG. 8 shows a more detailed block diagram of the fuse block 114. Fuses 120 are interconnected between the unfused power source 112 and each of the power buses 116. In addition, the fuse block 114 includes a microcomputer controller 130, a watch dog timer 132, a power supply 134, and a number of buffers B1-B6. The controller 130 applies control signals to a control bus 131 and reads multiplexed signals from the control bus 131, and the buffers B1-B6 are controlled to ensure that the control bus 131 is interconnected with only one of the control buses CB1-CB6 at any given time. In this way, the total length of active control bus is minimized, thereby reducing electromagnetic interference and noise susceptibility. Reliability is also improved in that a short in any one of the control buses CB1-CB6 will not interfere with proper operation of the remaining control buses.

Figure 9:
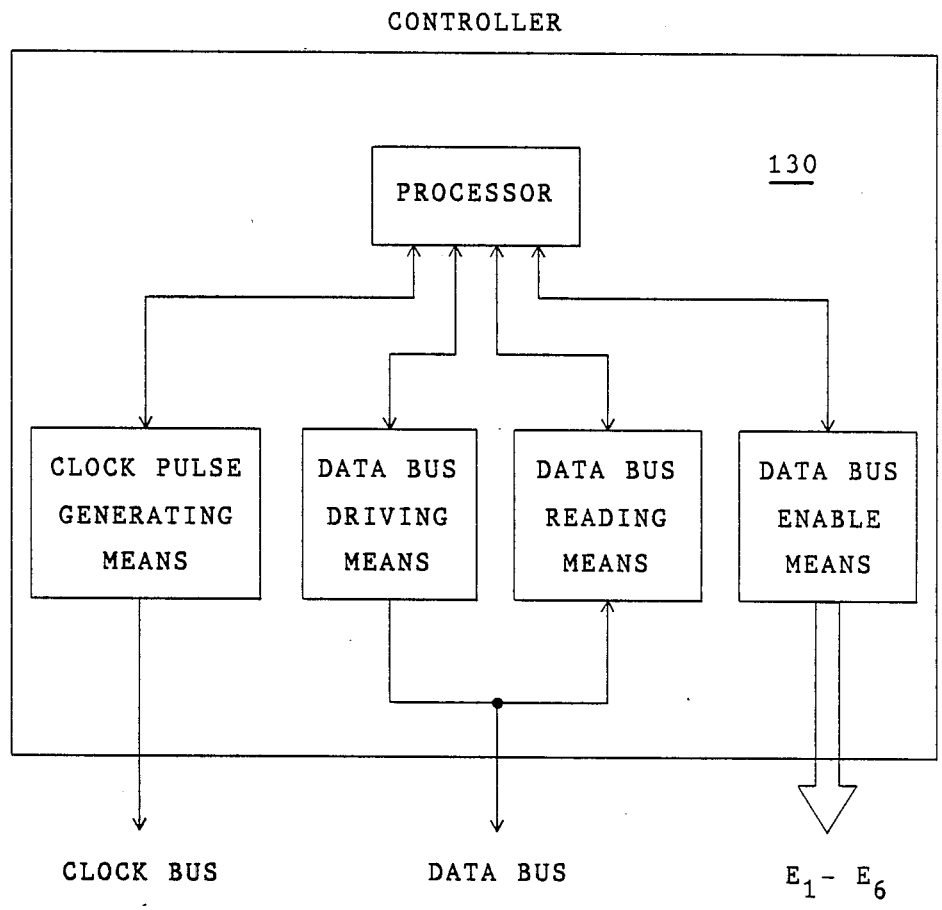
FIG. 9 is a block diagram of the controller of FIG. 8.

As shown in FIG. 9, the controller 130 includes a clock pulse generating means which generates sets of clock pulses on a clock bus, along with data bus driving means and data bus reading means for applying multiplexed signals to and reading multiplexed signals from a data bus, respectively. The clock and data buses are both included in the control bus 131. The controller 130 also includes buffer enable means which generates enable signals E1-E6 to control the buffers B1-B6, and each of these four means is controlled by a processor.

The processor controls the clock pulse generating means to generate clock pulses in sets separated by a period of no clock pulses. Each set of clock pulses comprises n subsets, where n is equal to the total number of separately addressed remote stations, as described below. Each subset includes eight clock pulses, and each clock pulse defines a respective data transmission time slot or channel on the data bus. Thus, each remote station is enabled for one subset of clock pulses (consisting of eight clock pulses and therefore eight time slots) within each set of clock pulses. The processor maintains a table of the state of all of the data channels, including both commands (sent from the controller 130 to the remote stations) and responses (sent from the remote stations to the controller 130). The data bus driving means of the controller 130 uses this table to drive the data bus high or low as appropriate to ensure that commands are sent by the controller 130 to the remote stations at appropriate times to transmit the command portion of the table. The data bus reading means of the controller 130 samples and stores the state of the data bus at appropriate times to ensure that responses from the remote stations are stored in appropriate locations of the table.

The multiplex system 110 of FIG. 7 includes input units 136 and output units 138 that are coupled to the control buses. The input units 136 convert standard signals into a time multiplexed format and apply them at appropriate times to the respective control buses. The output units 138 read the state of the data bus of the control bus at selected times, and latch the reading, which is then used for control purposes.

Figure 11:
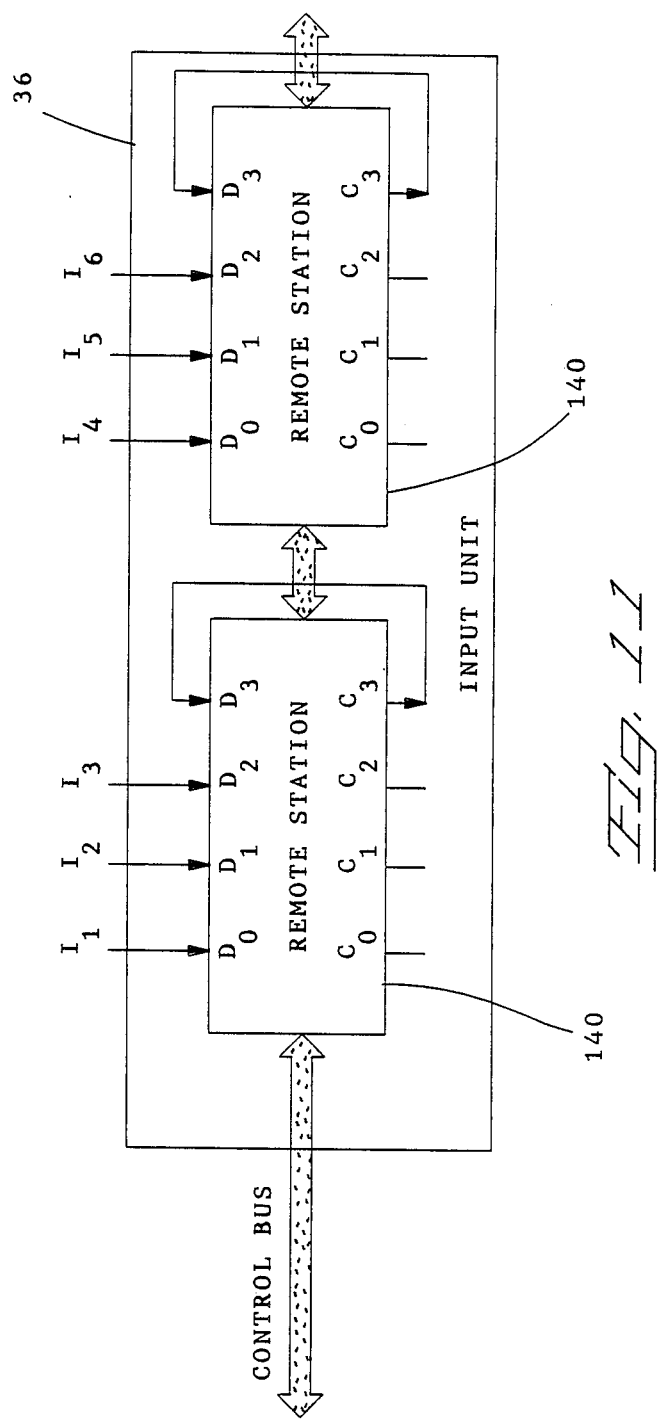
FIG. 11 is a block diagram of one of the input units of FIG. 7.

FIG. 11 shows a block diagram of one of the input units 136. As shown in FIG. 11, each input unit 136 includes two remote stations 140, each of which has inputs D0–D3 for four data signals to be multiplexed and applied to the control bus, and outputs C0–C3 for four command signals which are read from the control bus, demultiplexed, and applied as outputs on the respective terminals. As shown in FIG. 11, control output C3 is applied directly to data input D3 to check for proper operation of each remote station 140.

Figure 10:
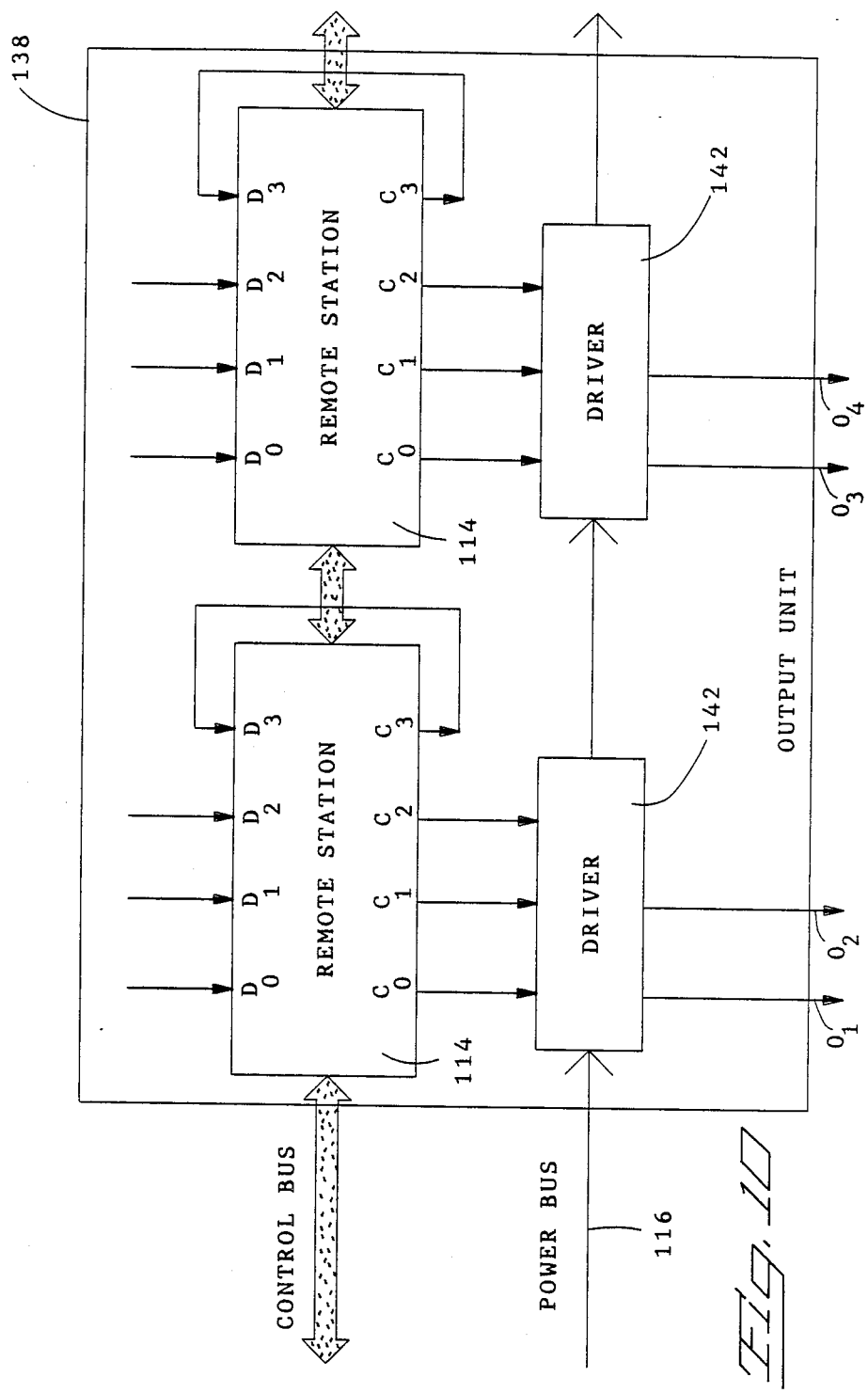
FIG. 10 is a block diagram of one of the output units of FIG. 7.

FIG. 10 shows a block diagram of one of the output units 138, which also includes two remote stations 140 of the type described above. Each output unit 138 also includes two drivers 142 which are interconnected with the power bus 116. Depending upon the state of the control signals C0–C2, the drivers 142 either apply 12 VDC or VDC to power outputs 01–04.

Figure 12:
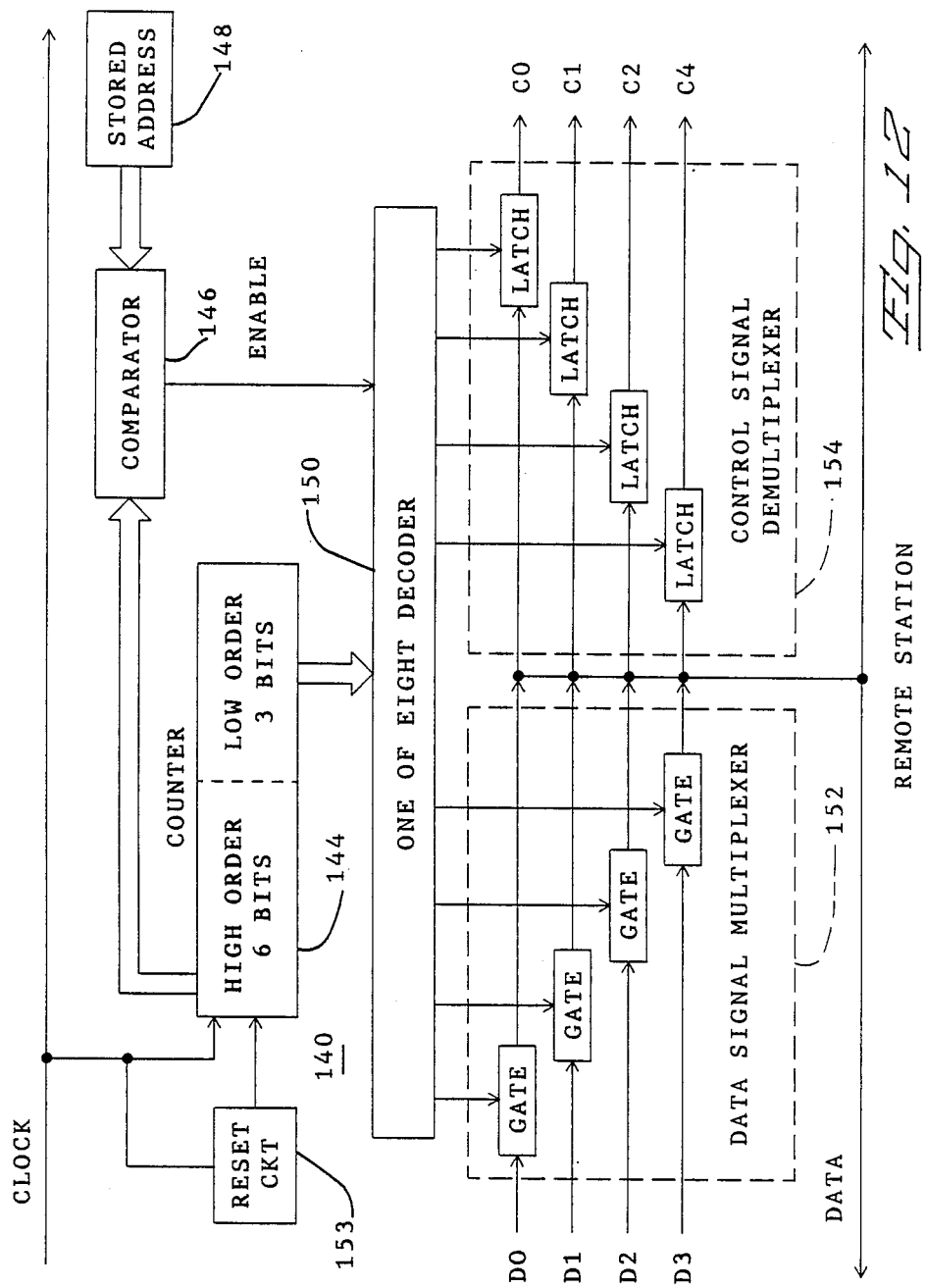
FIG. 12 is a block diagram of one of the remote stations of FIGS. 10 and 11.

FIG. 12 shows a block diagram of one of the remote stations 140, which interacts with both the clock bus and the data bus included in the control bus. Each remote station 140 includes an eight bit counter which has a higher order 6 bit section and a lower order 3 bit section. This counter is responsive to the clock pulses on the clock bus. The high order 6 bits of the counter 144 are compared in a comparator 146 with a stored 6 bit address stored in the means 148. When the high order 6 bits of the counter 144 are equal to the stored address in the means 148, the comparator 146 enables a decoder 150 that decodes the low order 3 bits of the counter 144. Typically, each of the remote stations 140 in the system will have a unique address. The remote station 140 includes a data signal multiplexer 152 which includes four gates, each operating to gate a respective one of the data signals D0–D3, as well as a control signal demultiplexer 154 which includes four latches, each arranged to latch and hold a respective one of the control signals C0–C3. Each of the gates and each of the latches is connected to the data bus included in the control bus.

For the eight clock pulse cycles during which the comparator 146 enables the decoder 150, the decoder 150 sequentially enables respective ones of the gates and latches. When any one of the gates is enabled, it applies the respective data signal D0–D3 to the data bus. Similarly, when any one of the latches is enabled, it latches and holds the state of the data bus at the corresponding time, and applies the latched state as a command signal C0–C3.

In order to synchronize the counter 144 with the controller 130, the remote station 140 includes a reset circuit 153 which monitors the clock bus for an absence of clock pulses. Whenever the reset circuit 153 fails to detect a clock pulse for a selected time interval, the reset circuit resets the counter 144 to zero. The controller transmits the clock pulses in sets, and each set is separated by a period of no clock pulses longer than the selected time interval of the reset circuit 153. Thus, the reset circuit 153 resets the counter 144 between each set of clock pulses.

The present invention is not limited to the particular type of vehicle multiplex system described above; however, further features of this multiplex system can be found in U.S. patent application Ser. No. 107,623 (filed Oct. 9, 1987), which defines the presently preferred construction for the fuse block 14, buses CB1–CB6, input and output units 36, 38; 064,917 (filed June 19, 1987), which defines the presently preferred structure for the driver 42; and 837,911 (filed March 10, 1986), which defines the presently preferred structure for the data bus driving and reading means of the controller; along with U.S. Pat. No. 4,682,168, and which define the presently preferred embodiment for the remote station 140. The type A remote stations of the first embodiment described above are identical to the remote stations 140 of this embodiment. All of these patent documents are hereby incorporated by reference.

In this embodiment the data signal transmitting means of FIG. 9 is implemented as a UART which transmits data signals from the controller 30 to the input and output units 36 and 38. The detailed operation of the UART is discussed in above-identified U.S. patent application Ser. No. 837,911.

As pointed out above, in the event any one of the data conductors included in one of the control buses CB1–CB6 is shorted to ground, the input and output units associated with the shorted data conductor will not receive accurate data signals from the controller 130. In order to prevent erroneous data signals from being latched by the output units 138 associated with a shorted data conductor, the embodiment of FIGS. 7–13 periodically checks the status of the data conductors.

Figure 13:
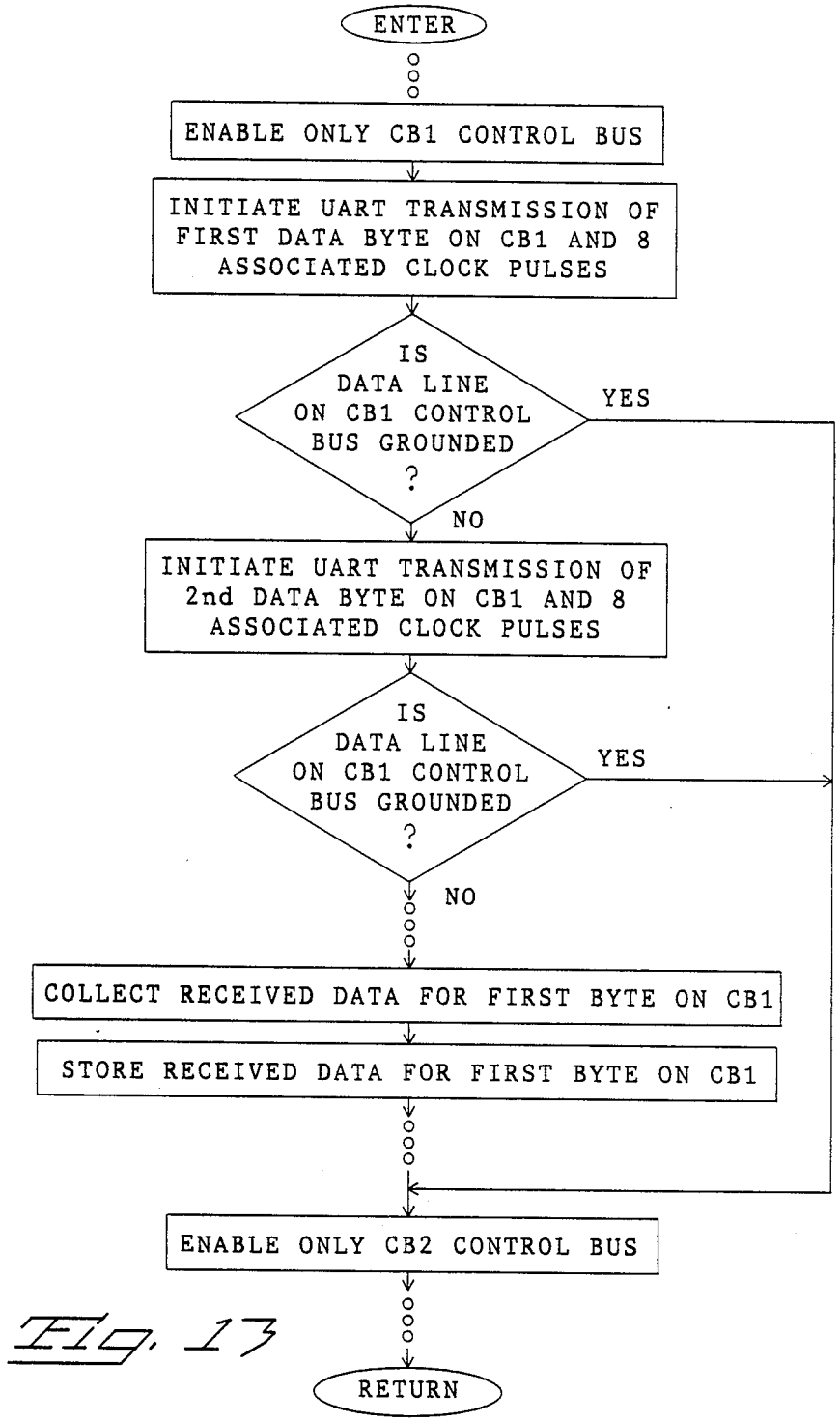
FIG. 13 is a flow chart of a routine executed by the controller of FIG. 8.

FIG. 13 shows a flow chart of a portion of the program executed by the controller 130, which illustrates the manner in which the controller 130 monitors for and responds to failures of the control buses CB1–CB6. The controller 130 enables only one of the control buses CB1–CB6 at a time and it monitors for bus failure only in connection with the transmission of data signals to the output units 138 on the enabled control bus. FIG. 13 flowcharts only the portion of the program relating to communication between the controller 130 and the input and output units on the control bus CB1.

In this embodiment the output units 138 on bus CB1 are given lower addresses than the input units 136, so that data signals are first set to all of the output units 138 on CB1, and then data signals are read from all of the input units 136 on CB1. The controller 130 includes a UART which generates both clock signals on the clock conductor and data signals on the data conductor of the enabled control bus.

As shown in FIG. 13, after the control bus CB1 is enabled, UART transmission of the first data byte on CB1 is initiated. This is accomplished by loading the first data byte from controller memory into the UART register. This automatically causes the UART to generate 8 clock signals on the clock conductor of CBI and to generate 8 data signals on the data conductor of CB1, each synchronized with a respective one of the clock pulses. If UART transmission is not initiated, no clock signals are generated.

As pointed out above, the remote stations of the output units 138 only receive data signals for four of the eight bits the remote station is enabled. The bus is inactive-high, and a positive voltage on the data conductor is decoded as Logic 0. For this reason each data byte is preferably in the form DODODODO, where D is a data bit to be transmitted from the controller to one of the output units and O is Logic 0.

After UART transmission has been initiated (but before transmission has actually begun) the program of FIG. 13 checks the voltage on the data conductor of CB1. This voltage should be a positive voltage (Logic 0), since the data conductor is not in use before UART transmission begins. If the data conductor is at ground potential (indicating a short circuit) the program branches to prevent further UART generation of data bytes or clock pulses on CB1. Otherwise, the program proceeds to initiate UART transmission of the next data byte on CB1. Each time UART transmission is initiated the data conductor of CB1 is checked for a short circuit condition. By checking the data conductor after rather than before initiation of UART transmission, significant savings in execution times are obtained.

program can immediately enable the next control bus, without sending out any clock or data signals on the failed bus.

Table 3 provides an object code listing of a routine corresponding to the flow chart of FIG. 13. This listing is designed for use on an Intel 8051 microprocessor that includes a UART. The UART is initialized to Mode 0, the data bytes to be transmitted by the UART are stored in addresses 20H-2AH, and received data bytes are stored in addresses 30H-38H.

TABLE 3

| MEMORY ADDRESS | | | | | | | | | | | | | | | | |
|---|---|---|---|---|---|---|---|---|---|---|---|---|---|---|---|---|
| 000564 | C2 | AF | 75 | 90 | 7D | 90 | 07 | DB | E5 | 20 | 54 | 0F | 93 | C2 | B5 | D2 |
| 000574: | B5 | F5 | 99 | 30 | B4 | 17 | E5 | 20 | C4 | 54 | 0F | 93 | 00 | 00 | F5 | 99 |
| 000584: | 30 | B4 | 0A | E5 | 21 | 54 | 0F | 93 | 00 | 00 | 00 | F5 | 99 | E5 | 21 | C4 |
| 000594: | 54 | 0F | 93 | 00 | 00 | 75 | 90 | BD | F5 | 99 | 30 | B4 | 68 | E5 | 22 | 54 |
| 0005A4: | 0F | 93 | 00 | 00 | 00 | F5 | 99 | 30 | B4 | 5B | E5 | 22 | C4 | 54 | 0F | 93 |
| 0005B4: | 00 | 00 | F5 | 99 | 30 | B4 | 4E | E5 | 23 | 54 | 0F | 93 | 00 | 00 | 00 | F5 |
| 0005C4: | 99 | 30 | B4 | 41 | 00 | 00 | 00 | 00 | 00 | 78 | 30 | 75 | 99 | FF | 30 | B4 |
| 0005D4: | 34 | A2 | B4 | 13 | A2 | B4 | 13 | A2 | B4 | 13 | A2 | B4 | 13 | 75 | 99 | FF |
| 0005E4: | 00 | F6 | A2 | B4 | 33 | A2 | B4 | 33 | A2 | B4 | 33 | A2 | B4 | 33 | 75 | 99 |
| 0005F4: | FF | D6 | 78 | 31 | A2 | B4 | 13 | A2 | B4 | 13 | A2 | B4 | 13 | A2 | B4 | 13 |
| 000604: | 75 | 99 | FF | F6 | 00 | A2 | B4 | 33 | A2 | B4 | 33 | A2 | B4 | 33 | A2 | B4 |
| 000614: | 33 | 75 | 90 | DD | 75 | 99 | FF | D6 | 78 | 32 | A2 | B4 | 13 | A2 | B4 | 13 |
| 000624: | A2 | B4 | 13 | A2 | B4 | 13 | 75 | 99 | FF | F6 | 00 | A2 | B4 | 33 | A2 | B4 |
| 000634: | 33 | A2 | B4 | 33 | A2 | B4 | 33 | 75 | 99 | FF | D6 | 78 | 33 | A2 | B4 | 13 |
| 000644: | A2 | B4 | 13 | A2 | B4 | 13 | A2 | B4 | 13 | 75 | 99 | FF | F6 | 00 | A2 | B4 |
| 000654: | 33 | A2 | B4 | 33 | A2 | B4 | 33 | A2 | B4 | 33 | 75 | 99 | FF | D6 | 00 | A2 |
| 000664: | B4 | 13 | A2 | B4 | 13 | A2 | B4 | 13 | A2 | B4 | 13 | F5 | 39 | E5 | 23 | C4 |
| 000674: | 54 | 0F | 93 | F5 | 99 | 30 | B4 | 0E | E5 | 24 | 54 | 0F | 93 | 00 | 78 | 34 |
| 000684: | 00 | F5 | 99 | 30 | B4 | 00 | E5 | 24 | C4 | 54 | 0F | 93 | 75 | 90 | ED | F5 |
| 000694: | 99 | 30 | B4 | 31 | E5 | 25 | 54 | 0F | 93 | 00 | 00 | 00 | F5 | 99 | 30 | B4 |
| 0006A4: | 24 | E5 | 25 | C4 | 54 | 0F | 93 | 00 | 00 | F5 | 99 | 30 | B4 | 17 | E5 | 26 |
| 0006B4: | 54 | 0F | 93 | 00 | 00 | 00 | F5 | 99 | 30 | B4 | 0A | E5 | 26 | C4 | 54 | 0F |
| 0006C4: | 93 | 00 | 00 | F5 | 99 | 30 | B4 | 6F | E5 | 27 | 54 | 0F | 93 | 00 | 00 | 00 |
| 0006D4: | F5 | 99 | 30 | B4 | 62 | 00 | 00 | 00 | 00 | 00 | 75 | 99 | FF | 00 | 00 |  |
| 0006E4: | A2 | B4 | 13 | A2 | B4 | 13 | A2 | B4 | 13 | A2 | B4 | 13 | 75 | 99 | FF | F6 |
| 0006F4: | 00 | A2 | B4 | 33 | A2 | B4 | 33 | A2 | B4 | 33 | A2 | B4 | 33 | 75 | 99 | FF |
| 000704: | D6 | 78 | 35 | A2 | B4 | 13 | A2 | B4 | 13 | A2 | B4 | 13 | A2 | B4 | 13 | 75 |
| 000714: | 99 | FF | F6 | 00 | A2 | B4 | 33 | A2 | B4 | 33 | A2 | B4 | 33 | A2 | B4 | 33 |
| 000724: | 75 | 99 | FF | D6 | 78 | 36 | A2 | B4 | 13 | A2 | B4 | 13 | A2 | B4 | 13 | A2 |
| 000734: | B4 | 13 | 75 | 99 | FF | F6 | 00 | A2 | B4 | 33 | A2 | B4 | 33 | A2 | B4 | 33 |
| 000744: | A2 | B4 | 33 | 75 | 90 | F5 | 75 | 99 | FF | D6 | 78 | 37 | A2 | B4 | 13 | A2 |
| 000754: | B4 | 13 | A2 | B4 | 13 | A2 | B4 | 13 | F6 | E5 | 27 | C4 | 54 | 0F | 93 | F5 |
| 000764: | 99 | 30 | B4 | 0D | E5 | 28 | 54 | 0F | 93 | 00 | 00 | 00 | F5 | 99 | 30 | B4 |
| 000774: | 00 | E5 | 28 | C4 | 54 | 0F | 93 | 75 | 90 | F9 | F5 | 99 | 30 | B4 | 52 | E5 |
| 000784: | 29 | 54 | 0F | 93 | 00 | 00 | 00 | F5 | 99 | 30 | B4 | 45 | E5 | 29 | C4 | 54 |
| 000794: | 0F | 93 | 00 | 00 | F5 | 99 | 30 | B4 | 38 | E5 | 2A | 54 | 0F | 93 | 00 | 00 |
| 0007A4: | 00 | F5 | 99 | 30 | B4 | 2B | 00 | 00 | 00 | 00 | 00 | 75 | 99 | FF | 30 |  |
| 0007B4: | B4 | 1F | A2 | B4 | 33 | A2 | B4 | 33 | A2 | B4 | 33 | A2 | B4 | 33 | 75 | 99 |
| 0007C4: | FF | D6 | 78 | 38 | A2 | B4 | 13 | A2 | B4 | 13 | A2 | B4 | 13 | A2 | B4 | 13 |
| 0007D4: | F6 | D2 | AF | 75 | 90 | FF | 22 | AA | AB | AE | AF | BA | BB | BE | BF | EA |
| 0007E4: | EB | EE | EF | FA | FB | FE | FF | | | | | | | | | |
| OBJECT CODE COPYRIGHT 1987 AMP INCORPORATED | | | | | | | | | | | | | | | | |

If data bytes for all of the output units 138 on CB1 are transmitted, the program then collects and stores data signals from each of the input units 136 on CB1. The entire cycle then repeats for the next control bus CB2, and so on.

From this description it should be apparent that the program of FIG. 13 repeatedly checks the data conductors of the control busses CB1-CB6 for a grounded condition during periods when the URAT transmission has been initiated but before the buses are actually used for data transmission. In the event of a grounded data conductor (a bus failure), the program inhibits generation of further clock signals on the failed bus, without interfering with normal operation of the remaining buses.

Of course modifications are possible to the approach described above. For example, immediately after each bus CB1-CB6 is enabled, the associated data conductor can be checked for failure. In the event of a failure, the Of course, it should be understood that a wide range of changes and modifications can be made to the presently preferred embodiment described above. For example, it is not critical that each subset of clock pulses define eight windows which alternate commands and responses. Rather, the number of windows in each subset of clock pulses can be varied as required, and the grouping of commands and responses may be modified to suit the intended application. For example, the type A interface circuits may be provided with only command inputs and the type B interface circuits with only response inputs, or vice versa. Alternately, the commands and responses within an eight window system may be arranged as four commands followed by four responses. If desired to improve reliability over long signal propagation distances, clock cycles can be inserted between the command windows and the response windows. Of course, it is not necessary in all applications that both the power and ground conductors be included in the bus, and it is entirely feasible to provide alternate power sources such as batteries for the interface circuits. As yet another alternative, the present invention is well suited for use in fiber optic systems. In such systems, it may well be preferable to multiplex the clock and data signals onto the same fiber optic cable or other data channel.

Related U.S. patent application Ser. No. 06/567,476 describes a preferred packaging arrangement for the interface circuits. As described in this application, the conductors of the bus 16 can be arranged as side-by-side conductors. Alternately, they can be arranged as a pair of coaxial conductors in which the data and clock conductors are shielded by coaxial braids which carry the ground and five volt power signals. Preferably, in this arrangement the coaxial braids are interconnected at regular intervals by capacitances to insure that the braid carrying the five volt signal performs a proper shielding function.

Though the preferred embodiment of the interface circuits 14a, 14b has been described above as including both a lower order window counter 18 and a higher order address counter 20, it should be apparent that in fact these two counters 18, 20 cooperate to maintain a consecutive count of the clock pulses. When looked at in this way, it is clear that the interface circuits 14a, 14b each enable each of the response gates 32 and command latches 30 at a respective clock period of the set of clock periods. It should therefore be clear that it is not necessary in all applications to include separate counters to perform these functions.

It is therefore intended that the foregoing detailed description be regarded as illustrative rather than limiting, and that it be understood that it is the following claims, including all equivalents, which are intended to define the scope of this invention.

I claim:

1. In a multiplex system of the type comprising bus means; a central controller coupled to the bus means and comprising means for applying clock signals to the bus means, means for receiving data signals from the bus means, and means for applying data signals to the bus means; and a first remote station coupled to the bus means and comprising first means for maintaining a count of the clock signals and means for applying a first data signal to the bus means during a time period corresponding to a first selected count; and a second remote station coupled to the bus means and comprising second means for maintaining a count of the clock signals and means for receiving a second data signal from the bus means during a time period corresponding to a second selected count, the improvement comprising:

third means for detecting a failure of the bus means; and fourth means, responsive to the third means, for preventing the clock signal from being carried at least to the second remote station during a detected failure of the bus means.

2. The invention of claim 1 wherein the first selected count differs from the second selected count.

3. The invention of claim 1 wherein the bus means comprises a clock conductor for carrying the clock signals and a data conductor for carrying the data signals.

4. The invention of claim 3 wherein the third means comprises means for detecting when the data conductor is shorted to ground.

5. The invention of claim 4 further comprising means for activating the third means during periods when the first remote station is not applying the first data signal to the bus means and when the central controller is not applying data signals to the bus means.

6. In a multiplex system comprising bus means; a central controller comprising means for applying clock signals to the bus means, means for reading data signals from the bus means, and means for applying data signals to the bus means; and a plurality of remote stations, each comprising means for maintaining a respective count of the clock signals, and means for exchanging a respective data signal with the bus means during a time period designated by a respective count, the improvement comprising:

a plurality of individual buses included in the bus means, each radiating from the central controller and each interconnecting the central controller with a respective subset of the remote stations;

means, included in the central controller, for detecting a failed one of the individual buses; and means, responsive to the detecting means, for preventing the clock signals from being carried to the subset of remote stations associated the failed one of the individual buses.

7. The invention of claim 6 wherein the detecting means is activated to check for failure of the individual buses during time periods when the respective buses are not receiving data signals.

8. The invention of claim 7 wherein the preventing means comprises means for isolating only the failed one of the individual buses from the clock signals, without interfering with normal operation of the remaining ones of the individual buses.

9. The invention of claim 8 wherein each of the individual buses comprises a respective clock conductor for carrying the clock signals and a respective data conductor for carrying the data signals.

10. The invention of claim 9 wherein the detecting means comprises means for detecting when each of the data conductors is shorted to ground.

* * * * *

UNITED STATES PATENT AND TRADEMARK OFFICE
CERTIFICATE OF CORRECTION

PATENT NO. : 4,841,520

DATED : June 20, 1989

INVENTOR(S) : Lee W. Steely

It is certified that error appears in the above-identified patent and that said Letters Patent is hereby corrected as shown below:

Column 16, line 37, after "associated" insert -- with --.

Signed and Sealed this

Twenty-sixth Day of September, 1989

Attest:

DONALD J. QUIGG

Attesting Officer

Commissioner of Patents and Trademarks